(12) United States Patent
Bergann et al.

(10) Patent No.: US 8,622,624 B2
(45) Date of Patent: Jan. 7, 2014

(54) OPTICAL PLUG CONNECTION FOR OPTICAL WAVEGUIDES

(75) Inventors: Ludwig Bergann, Berlin (DE); Ralf Malz, Jena (DE); Jens Konetzny, Weimar (DE)

(73) Assignee: LASOS Lasertechnik GmbH, Jena (DE)

( * ) Notice: Subject to any disclaimer, the term of this patent is extended or adjusted under 35 U.S.C. 154(b) by 647 days.

(21) Appl. No.: 12/669,908

(22) PCT Filed: Jun. 7, 2008

(86) PCT No.: PCT/EP2008/004553
§ 371 (c)(1),
(2), (4) Date: May 27, 2010

(87) PCT Pub. No.: WO2009/012845
PCT Pub. Date: Jan. 29, 2009

(65) Prior Publication Data
US 2010/0254655 A1 Oct. 7, 2010

(30) Foreign Application Priority Data

Jul. 20, 2007 (DE) .......... 10 2007 034 262
Oct. 22, 2007 (DE) .......... 10 2007 051 294

(51) Int. Cl.
*G02B 6/36* (2006.01)

(52) U.S. Cl.
USPC ............................ 385/53; 385/33

(58) Field of Classification Search
USPC ..................................... 385/53, 33
See application file for complete search history.

(56) References Cited

U.S. PATENT DOCUMENTS

| 4,101,197 | A  |   | 7/1978  | Kent et al.                 |
|-----------|----|---|---------|-----------------------------|
| 4,637,683 | A  |   | 1/1987  | Asawa                       |
| 4,753,510 | A  | * | 6/1988  | Sezerman ............ 385/61 |
| 4,868,361 | A  | * | 9/1989  | Chande et al. ...... 219/121.62 |
| 4,889,406 | A  | * | 12/1989 | Sezerman ............ 385/35 |
| 5,193,133 | A  |   | 3/1993  | Schofield et al.            |
| 5,195,155 | A  | * | 3/1993  | Shimaoka et al. ...... 385/90 |
| 5,428,704 | A  |   | 6/1995  | Lebby et al.                |
| 5,717,801 | A  | * | 2/1998  | Smiley ............... 385/60 |
| 5,937,123 | A  | * | 8/1999  | Frelier .............. 385/79 |
| 6,116,101 | A  | * | 9/2000  | Rader ............... 73/865.9 |
| 6,263,133 | B1 | * | 7/2001  | Hamm ............... 385/33  |
| 6,360,032 | B1 | * | 3/2002  | Berger et al. ....... 385/16 |
| 6,421,474 | B2 | * | 7/2002  | Jewell et al. ....... 385/14 |
| 6,773,170 | B1 | * | 8/2004  | Georgiev et al. ..... 385/90 |
| 6,893,161 | B2 |   | 5/2005  | Nakura                      |
| 6,925,234 | B2 |   | 8/2005  | Alexeev et al.              |

(Continued)

FOREIGN PATENT DOCUMENTS

| DE | 32 38 049 C1   | 3/1984 |
| DE | 43 00 568 A1   | 7/1993 |
| DE | 198 40 935 A1  | 3/2000 |
| DE | 100 09 845 A1  | 9/2001 |

(Continued)

*Primary Examiner* — Kaveh Kianni
(74) *Attorney, Agent, or Firm* — Patterson Thuente Pedersen, P.A.

(57) ABSTRACT

An optical plug connection for optical waveguides including a plug and a matching socket, and also a method for adjusting the plug connection. In the case of such a plug connection, the plug has at least one planar, smoothed contact area oriented with respect to a propagation direction of a light beam passing from or into the plug, for bearing on a corresponding planar, smoothed mating contact area of the socket that is oriented with respect to the propagation direction of the light beam.

17 Claims, 3 Drawing Sheets

(56) References Cited

U.S. PATENT DOCUMENTS

| | | |
|---|---|---|
| 7,104,703 B2 * | 9/2006 | Nagasaka et al. ............... 385/88 |
| 7,128,473 B2 * | 10/2006 | Fluck et al. .................... 385/90 |
| 2004/0114873 A1 * | 6/2004 | Alexeev et al. ................. 385/52 |
| 2005/0013328 A1 * | 1/2005 | Jurgensen ........................ 372/6 |
| 2005/0147347 A1 * | 7/2005 | Fluck et al. .................... 385/33 |
| 2011/0189421 A1 * | 8/2011 | Sherman et al. ........... 428/36.91 |

FOREIGN PATENT DOCUMENTS

| | | |
|---|---|---|
| DE | 102 53 910 A1 | 5/2003 |
| EP | 1 256 827 A2 | 11/2002 |
| JP | 09-171115 | 6/1997 |
| JP | 09293774 A * | 11/1997 |
| JP | 2004-512576 | 4/2004 |
| WO | WO 02/39152 A2 | 5/2002 |

* cited by examiner

OPTICAL PLUG CONNECTION FOR OPTICAL WAVEGUIDES

PRIORITY CLAIM

The present application is a National Phase Entry of PCT Application No. PCT/EP2008/004553, filed Jun. 7, 2008, which claims priority to German Application Number 102007051294.7, filed Oct. 22, 2007, and German Application No. 102007034262.6, filed Jul. 20, 2007, the disclosures of which are hereby incorporated by reference herein in their entirety.

FIELD OF THE INVENTION

The invention relates to an optical plug connection for optical waveguides and its components, i.e. a plug and a matching socket, and a method for making an optical plug connection for optical waveguides.

BACKGROUND OF THE INVENTION

The use of laser beams is the basis for a great number of applications such as, e.g., medical surgery methods, the investigation and machining of materials, or the investigation and manipulation of biological samples in, for example, laser scanning microscopy. The instruments used in many of these applications are supplied with laser radiation by means of optical waveguides. For this purpose, the laser beam must, after its exit from the radiation source or another optical component, be coupled into the optical waveguide by means of a coupling device and coupled out again at the site of application, i.e. in the respective instrument, by means of another coupling device. In the instrument, the laser beam propagates as a free, unguided beam—i.e. not within an optical waveguide—and is used in the respective application. To keep radiation losses and imaging aberrations as low as possible and to maintain the highest possible beam quality during coupling into the instrument, the optical waveguide must be very accurately positioned relative to the coupling optics. Accordingly, during its outcoupling, the beam must be introduced into the respective instrument with high accuracy with regard to the direction and position of beam propagation. Such coupling devices, as a rule plug connections consisting of plug-and-socket pairs, are internationally classified in four quality grades denoted A through D. The higher the quality, the higher are the effort and expense in manufacturing, as a rule.

All coupling devices known in prior art have in common that the disconnection and subsequent remaking of such an optical waveguide connection, at least in cases where the optical waveguide is plugged to another instrument or where a different optical waveguide, even of the same type, is fixed to the same instrument, laborious readjustments are always necessary unless one would accept considerable performance and quality losses of the transmitting light or beam maladjustments. Disconnection of an optical waveguide plug connection may be necessary, for example, in order to make possible a simple change of the light sources—e.g., the use of a laser of different wavelength—and/or of the feeding points—e.g., feeding the light to a different instrument. In prior art there exist various products in which mounting and adjusting mechanisms are combined with focusing optics. The necessary—maximally six—degrees of freedom are set by means of various operating principles and adjusting strategies. All solutions known in prior art, however, require a great deal of adjustment work, which during integration into the respective instrument has to be done, as a rule, by trained service staff on the site of installation. Nevertheless, the coupling afterwards will not be fixed well enough to ensure a lasting, stable quality of the beam coupling or outcoupling.

DE 198 40 935 B4, for example, describes an end piece for optical fibers, which serves for coupling laser radiation into or out of an optical fiber. As shown in FIG. 11 of the document cited, the end piece is connected to the housing that accommodates the pumping source, via a mount. The end piece is provided with one or several outer fitting surfaces, which serve(s) as reference surface(s) for aligning the beam of light. These fitting surfaces are all provided on the circumference around the end piece. The end piece is then plugged into the housing so that its fitting surfaces bear against the mount. The end piece is further provided with means for adjusting the position of the optical fiber relative to the fitting surfaces. By means of these adjusting means, e.g., screws, the optical fiber is aligned relative to the cylindrical or conical reference surfaces. Fitted to the front end of the end piece is a collecting lens for coupling the radiation in or out. If the end piece is disconnected from the housing and inserted into another housing of the same design, it is true that the adjustment of the optical fiber relative to the fitting surfaces is maintained, but there is the added problem of correctly inserting the fitting surfaces into the mount of the housing so that the alignment of the of the end piece in the housing is optimum. As the reference or fitting surfaces and the mounts are of cylindrical or conical shape, inevitable manufacturing tolerances bring it about that, as the end piece is simply inserted into the housing, the symmetry axes of end piece and housing form a small angle between them, as a rule. Even though the deviations are very small, they will result in quality losses. While an exactly parallel alignment will be possible, as a rule, this will take a lot of time and sensitive dexterity.

Another device for adjusting an optical fiber is described in DE 32 38 049 C1. Here, a housing contains a focusing element such as a collimating lens; the adjusting devise essentially consists in an adjusting ball with a through-hole accommodating the optical fiber. The adjusting ball is bearinged so as to be not only rotatable but also translatable parallel to the optical axis of the collimating lens. This allows the exit surface of the optical fiber to be positioned at the focus of the collimating lens so that the best possible coupling or outcoupling is achieved. Once adjustment has been accomplished, the guide sleeve or the housing can be connected with a suitable other element allowing the beam to be utilized. In this case, the outer surfaces of the guide sleeve serve as fitting surfaces, so that, when such a connection is made or disconnected, the Problem of readjustment occurs just as in case of the previously cited document.

The same problem occurs with the end piece described in U.S. Pat. No. 6,796,720 B2: An optical fiber is inserted into a ferrule; this ferrule is plugged into the end piece and aligned there axially and radially by means of adjusting screws relative to a collimating lens fitted to the front end of the end piece. The end piece, of cylindrical outer shape, can, in turn, be plugged into a corresponding mount.

A different arrangement, intended to bring about the optical coupling or outcoupling of radiation with the best possible efficiency, is described in U.S. Pat. No. 6,925,234 B2. Unlike the arrangements described before, in which fiber and lens were arranged in one and the same end piece, the last-mentioned arrangement accomplishes a high flexibility with regard to the relative adjustment of fiber and lens, in that the end piece consists of two parts. In a first part of the plug, the fiber is fixed in a ferrule, whereas the lens is rigidly arranged in a second part of the plug. Then the first and the second part of the plug can be rigidly connected, e.g. by means of screws. However, the first part of the plug, which accommodates the fiber, is designed in such a way that, despite the rigid connection of the two parts of the plug, a flexible axial and radial adjustment of the position of the exit surface of the fiber is possible by means of adjusting screws. This possible because the first part of the plug, although one piece, itself consists, in a way, of two segments, with enough material being removed between these two segments as to form a kind of elastic hinge. The end piece or the multipart plug has a cylindrical outer shape, so that, when a connection with an instrument intended to utilize the radiation is disconnected or remade, the same problems with adjustment occur as with the arrangements described before. As the alignment of the fiber end surface and the lens are effected via adjustments on the single-piece elastic hinge, such adjustment is rather laborious.

SUMMARY OF THE INVENTION

A problem solved by the invention is to create an optical plug connection that permits the user to easily disconnect it and reconnect it in a different configuration of equivalent component configuration without requiring readjustment. Moreover, such an optical plug connection is to be provided with simple and robust means for factory adjustment of its components in the manufacturing process, especially for of the fiber relative to a lens through which the light beam enters or exits, and for adjustment of the unit of fiber and lens relative to external fitting surfaces.

In an optical plug connection of the type described at the start, this problem is solved in such a way that the plug is provided with at least one plane, smoothed contact face that is aligned relative to a propagation direction of a light beam, this contact face to rest on at least one corresponding plane, smoothed mating contact face of the socket, that is aligned relative to the propagation direction of the light beam.

Such a plug connection has considerable advantages compared to plug connections known in prior art: The contact faces and mating contact faces known in prior art are configured as fitting surfaces and mounts with cylindrical surfaces that surround the collimated beam. Such cylindrical surfaces, while having a larger surface area and thus offering a larger resting face, cannot be manufactured, unless with extreme effort, to the high accuracy needed to allow the plug to be disconnected from the socket and replugged, or the plug to be replaced with an equivalent plug, without readjustment.

In principle, this problem also occurs with plane surfaces, but these can be smoothed by simple methods, so that planeness accuracies of 100 nm height difference or less can be attained. In this, the contact face is aligned relative to a propagation direction of a light beam exiting or entering the plug; the same preferably also applies to the corresponding plane, smoothed mating contact face of the socket. In the connected state, the contact face of the plug rests on the mating contact face of the socket. The planeness of the mating contact face is the more important criterion, though, as it defines the resting position.

If, then, the contact face is aligned at a certain angle relative to the propagation direction of the light beam, which, for example, exits the plug in a collimated state, the mating contact face of the socket necessarily has a corresponding alignment, unless beam deflection means are provided immediately at the beam's entry into the socket. The angle included by the light beam and the contact face or with the mating contact face, respectively, may as well be zero degrees, i.e. with the light beam running parallel to the contact face or mating contact face. It is feasible that such configurations comprise corresponding plugs and sockets, with the plug being, e.g., simply pushed into the socket.

Aligning the beam relative to such a parallel plane is relatively complicated, though. In a an example embodiment of the invention, therefore, the light beam intersects a plane in which the at least one contact face and the at least one mating contact face lie, for example at a right angle of ninety degrees. It is to be understood that all other angles between 0° and 90° are possible; in case of perpendicular intersection, though, the design can be easily implemented; in addition, it is easy to check the alignment of the surface relative to the beam. For this purpose, one can, e.g., determine the deviation of the beam from the perpendicular to the contact face at a distance of one meter by means of the rotation method described below. This yields a direct readout of which spots of the contact face still require correction, and how much, in order to attain the necessary planeness and alignment. With oblique light incidence, let alone a beam parallel to the plane, this is more difficult, as the direction of the light has always a component in the plane, so that the area needing correction is not immediately evident. This applies, in particular, to very small angles and to a beam that runs parallel to the plane.

In one embodiment of the invention, the at least one contact face and the at least one mating contact face are mechanically smoothed, for example lapped or polished. These kinds of mechanical smoothing are particularly suitable for producing the desired planeness with high accuracy. However, the smoothing need not necessarily be brought about mechanically; other smoothing processes such as laser machining or electrochemical treatment are feasible and equivalently applicable, provided that they yield the necessary accuracy.

While the properties described above contribute to the proper function of the invented optical plug connections, irrespective of a specific form of plug or socket, the invention also relates to a plug and a socket that are suitable for use in the invented optical plug connection.

Such a plug comprises a first plug component with a fixture for accommodating the end, fixed in a mount, of an optical waveguide, a second plug component with a lens, means for aligning and fixing the end of the optical waveguide in the fixture along a beam direction, means for aligning the lens, and a third plug component, which has the at least one contact face and which is connected to the first and/or second plug component. The respective plug components may be connected in a frictional or positive mode, e.g., by means of rivets, adhesive, by welding or soldering, but preferably by means of screws. The splitting of the plug into three components—which is not mandatory, though—offers several advantages in manufacturing and adjusting. It is possible first to preadjust the position of the mount—which may be configured, e.g., as a ferrule—with the optical waveguide in the first plug component. Subsequently, the second plug component is connected to the first one, and the lens is aligned relative to the mount, with a further fine adjustment of the light exit surface of the optical waveguide in the mount also being possible. Once the lens and the fiber end have been adjusted, the third plug component can be attached. This third plug component contains the at least one contact face, which, according to the invention is plane, smoothed and aligned, or is being aligned during adjustment, relative to the propagation direction of a light beam.

A person skilled in the art may just as well consider that the second plug component need not necessarily be adjustable in a plane perpendicular to the propagation direction of the light beam; it may even be omitted altogether, as the effect can also be achieved in the following way: The lens would have to be fixed in the first plug component. The lens can then be centered relative to the light exit surface by means of a fitting surface that can be manufactured, e.g., by lens centering. Especially with greater focal lengths, this will lead to only low angular errors. The preadjustment of the light beam relative to the contact face may also be effected by tilting the first plug component relative to the third one, e.g., by means of shims between the two plug components or by beveling at least one of the two contact faces of the first and the third plug component, e.g., by turning, milling or grinding.

The lens may be a single lens element or, equivalently and with the same effect, an optical system of several lens elements, which may be cemented to each other or mounted in a fixture at specified distances from each other, such as, e.g., an achromat. For the sake of simplicity, these varieties are collectively termed "lens" here. It is understood that the invented arrangement also includes the reverse light path, in which the light beam enters the optical waveguide, which then has a light entry surface.

Thanks to the multi-component design it is possible to carry out the smoothing and aligning of the at least one contact face only after the lens and the fiber end have been adjusted and fixed relative to each other. This separation of the lens-fiber system on the one hand and beam guidance on the other creates one of the prerequisites for the reproducible disconnection and reattachment of plug and socket without readjustment.

In this design it is of advantage if at least an outer layer of the at least one contact face consists of hardened material, preferably of an alloyed metal. The alloy may be hardened by surface hardening. Especially alloyed metals can be mechanically smoothed by relatively simple means, e.g., by lapping or polishing. Other contact faces, made, e.g., of a hard plastic material smoothed by suitable methods, are also feasible. The third plug component may, for example, be made pf a single piece, so that the at least one contact face forms one surface of this third plug component. The entire third plug component may be made of the hardened material, but subsequent hardening by suitable methods, e.g., heating the surface layers by means of lasers, is feasible as well, just as is the production of hard layers on light alloys by anodizing. If aluminum or titanium is used, hard oxide layers can be formed. The hard layer may also be produced by application of an added layer of a different material of suitable hardness. Suitable materials in this case are, e.g., $SiO_2$ or $Al_2O_3$. In this case, only such surfaces need to be processed that contain at least one contact face. As another possibility, the plug can be provided with suitable inserts of a hard or hardened material in the places intended for the contact faces. Suitable materials for such inserts, apart from such of hardened metal as described, are ceramics, sapphire or fused quartz, or other materials of similar hardness. If only inserts of hard or hardened material are used, the requirements which the remaining material of the plug or the third plug component, respectively, must satisfy are less stringent, which reduced the manufacturing costs.

The simplest way is to configure the contact face—just as the mating contact face on the socket—as a continuous surface. Unless these surfaces are too large, the necessary planeness of less than 100 nm height difference can be attained with relatively small effort. If, however, dirt settles on one of the surfaces, connection of the components will cause dirt particles to be enclosed between the two surfaces. This may lead to noticeable maladjustment. In an example embodiment of the invention, therefore, the plug has several contact faces in the form of contact feet. These contact feet need to extend only over a small area of the surface that in its entirety may serve as a contact face or contact plane. The inserts mentioned before may then, for example, be integrated into the feet. As, in the process of connecting plug and socket and locking the plug in the socket, the contact face and the mating contact face are, as a rule, shifted against each other by a pushing or rotating movement, dirt particles can thus be prevented from getting stuck between the surfaces. As the two faces exactly fit each other, the movement pushes dirt particles away so that they cannot get between the two faces. Dirt particles lying between the faces are removed by the rotation. In addition, the use of several small contact faces offers the advantage of simpler machining and alignment. The number of contact feet as well as their size should be as small as possible: the number might be three or four, for example.

The described properties of the contact face regarding their composition and form can also be applied to the mating contact face of a socket according to the invention. Here again, mating contact faces in the form of mating contact feet may be provided; what is important, however, is that in the process of connecting plug and socket up to their final locking in place there is always a contact between contact face and mating contact face. This must be heeded especially if the connecting process includes a rotary or pushing movement.

The mount that accommodates the optical waveguide may be configured, e.g., as a ferrule. Usually the optical waveguide with the ferrule is adjusted by displacement in the longitudinal direction. In this process, the ferrule is shifted in the fixture and locked in the desired position. This can be done, e.g., by means of a locking screw. Such a screw, however, exerts a pressure on the fiber via the ferrule, which may change the light guiding properties of the fiber. Instead of a screw or equivalent means, it is also possible to make a closure by adhesive force, e.g., by adhesive bonding between the ferrule and the fixture. However, subsequent readjustment will not be possible then. Therefore, it is advantageous if the means for aligning the end of the optical waveguide comprise a sleeve in which the ferrule is fixed. This sleeve may be made of metal or ceramics, for example. The sleeve completely encases the ferrule; for adjusting the optical waveguide, the sleeve with the ferrule is shifted. In this way, no abrasion will occur at the ferrule, and the sleeve will protect the ferrule against pressure-induced deformations across the symmetry axis. Alternatively instead of a sleeve, a collet chuck may be used. This also will protect the ferrule against abrasion and prevent pressure-induced deformations. Adjustment is made by shifting the ferrule or the collet chuck, which firmly encases the ferrule, along the beam direction or the symmetry axis of the optical waveguide. With alignment completed, the sleeve or the collet chuck can be fixed by a locking screw. The walls of the sleeve, or of the collet chuck, respectively, are thick enough so as to prevent any pressure-induced deformation of the ferrule and, thus, of the fiber by the process of locking in place by means of one or several screws. In principle, it is also possible, however, to design the sleeve or the collet chuck in such a way that the ferrule can be shifted within the sleeve or collet chuck before it is locked in place. In one embodiment, the ferrule and the sleeve or collet chuck should be made of ceramics, as this will not produce any abrasion. Adhesive joints are also possible.

Finally, the plug also comprises means for aligning the lens across the optical axis of the lens. If we designate the optical axis of the lens as z, the means of alignment permit alignment in the x-y plane. Alignment in this plane is thus made independent from alignment in the z direction, for which exclusively the optical waveguide is shifted. In on example embodiment, the means for aligning the lens comprise at least one resilient element for a non-positive connection of the second plug component to the first plug component. By means of the resilient element, which may be, e.g., a rubber element or a spiral spring but may be designed as a diaphragm, the second plug component with the lens is pressed against the first plug component with the fiber and the fiber end. The spring force or the contact pressure acts in the z direction, and its strength is selected so that shifting in the x-y plane by the action of force, as, for example, exerted by adjusting screws, remains possible. Inadvertent shifting in the x-y plane caused by the action of shocks should be excluded, though. The separation of z adjustment and x-y adjustment generally facilitates adjustment.

In another embodiment of the invention, the at least one resilient element is connected with the second plug component by one or several screws that connect the second plug component with the first one, so that the resilient element presses the second plug component against the first one. The second plug component has some slackness to allow alignment. Instead of screws, other equivalent fasteners may be used. The screws are connected to the first plug component via an exactly fitting thread; the respective holes in the second plug component are bigger, though, to enable alignment in the x-y plane. If the spring is designed as a diaphragm, this means that the point of support for the spring on the second plug component is not located directly at the periphery of the screw. This increases stability.

In an alternative embodiment of the plug, the at least one resilient element is connected, by one or several screws, with the third plug component instead of the first one. The third plug component is also connected with the first plug component, for example by screws; alternatively the connection can be designed so that the screws connect the at least one resilient element with the third and the first plug component, so that a firm screw connection is formed between all three parts. In this case, too, the second plug component has sufficient slackness for alignment.

In another version, the plug has a pressure piece, which presses the resilient element itself and, by way of this, the second plug component against the first plug component. The pressure piece can, for example, be screwed against the resilient element via a thread worked into the third plug component. Alternatively, screws are feasible by which the pressure piece is screwed to the first plug component, with the holes for the screws in the resilient element and in the second plug component being greater than exactly fitting, for the reasons described above. With the contact pressure not fully tightened, an adjustment of the second plug component in the x-y plane is still possible. In this way it can be achieved that, when the screws are being tightened and, thus, the diaphragm tensioned, a position change of the already adjusted second plug component is excluded.

The embodiment with a pressure piece just described can, of course, also be used with the first alternative by simple design changes. Among other things, it is suitable for use with plugs coupling laser light into a fiber. A highly accurate parallel alignment of the first third plug components is not needed then. Therefore it is possible in this case to configure the first and third plug components as a single-piece unit.

The contact faces may, in principle, be provided on the first or second plug component; to allow easy adjustment, however, it is of advantage to provide a third plug component on which the contact faces are provided. If the contact location at which the plug is pushed into the socket essentially is rotationally symmetrical with a rotation axis parallel to the beam, the unit of the first and second plug components can be shifted relative to the third plug component in a plane perpendicular to the light beam. In this way, the parallel position of the beam can be centered, i.e. adjusted with high accuracy to make the rotation axis coincide with the optical axis.

A socket according to the invention first features the at least one mating contact face described above. These mating contact faces may be mechanically smoothed, may also be hardened or consist of some hard material, e.g., in the form of inserts; several mating contact faces in the form of mating contact feet may be provided.

Especially if plug and socket, with regard to the optical axis, are designed essentially rotationally symmetric as far as their contact surfaces parallel to the light beam are concerned, the invented socket is may be provided with a centering collar for aligning the plug and thus, the light beam, in a plane perpendicular to the beam direction. In this case, first the plug is inserted into the socket. The centering collar may, for example, have a circular fitting surface, which engages with the circumference of the plug or of a housing. It is then subsequently put onto the socket. Instead of a circular fitting surface, a three-point contact arrangement can be used. In this way, too, lateral alignment of the beam is possible. This alignment can be done manually in a simple, unproblematic manner; the tolerance here (3-4 µm) is considerably higher than in aligning the contact faces relative to the beam direction. The centering collar can be shifted and fixed on the socket in such a way that the parallel position of the beam can be fixed at any desired point, e.g., relative to external contact points, by tightening the centering collar. Unless the plug has to be aligned with a subsequent optical system and if this system is rather aligned with the plug once and for all, the centering collar may also be designed stationary, i.e. centering collar and socket are fixed relative to each other. This can be accomplished in advance by a rigid connection, but also by making socket and centering collar of a single piece. In this case, again, no readjustment is necessary when the plug is changed.

Instead of a centering collar, a vee bearing can be used for aligning the plug or the light beam in a plane perpendicular to the beam direction. In this case, the plug is pressed against the contact positions of the vee bearing by means of a screw or a resilient element.

In one embodiment, the socket is further provided with a spring ring, by which the plug is fixed in the socket. For this purpose the plug may, e.g., have lugs protruding from its circumference that engage below the spring ring. Here, instead of a circular fitting surface, a discontinuous fitting surface may be used, which permits the plug to be inserted with a subsequent rotational movement to below the centering collar. The spring ring may, for example, also be provided with lugs. When the plug is rotated into the socket, a frictional connection is made between the lugs of the plug and those of the spring ring. The plug is pressed into the socket. The lugs on the spring ring are—at least partially—designed as springs, so that, when the plug is rotated to below the spring ring, the spring force increases and thus enhances the contact pressure. Finally, the contact pressure can be further enhanced by means of screws.

If polarization-preserving fibers are used, the first or the third plug component may be provided with a lateral index pin, relative to which the polarizing axis of the fiber is aligned by its rotation about the z axis. The socket belonging to the plug connection must then be provided with a corresponding stop for the index pin.

It is to be understood that within the scope of the present invention, the features mentioned before and explained below are applicable not only in the combinations stated but also in other combinations or as stand-alone features.

The invention also relates to a method for making an optical plug connection for optical waveguides, that comprises a plug and a socket especially as described before. For such a method, the problem is solved in that (i) an end of an optical waveguide held in a mount is inserted in a fixture for accommodating the mount in a first plug component, (ii) the plug component of the plug is connected with a second component of the plug, which contains a lens, (iii) the distance of a light exit surface of the optical waveguide from the lens is adjusted, and the optical waveguide is fixed in the first plug component, (iv) the position of the second plug component is adjusted in a plane essentially adjusted position, so that a specified angular position is set, and (v) at least one plane contact face of the plug and at least one corresponding, plane mating contact face of the socket into which the plug is inserted, are aligned relative to a propagation direction of a light beam by smoothing.

Whereas in prior art, cylindrical mounts or four-point or vee bearings derived from them, are used for accommodating cylinders for plug and socket, so that the corresponding contact faces and mating contact faces are of cylindrical shape or that support points are arranged on an imagined cylinder in space, the present invention uses plane surfaces. This may appear a disadvantage at first glance, since a socket with a cylindrical receptacle seems to provide a better hold for a correspondingly shaped plug. However, due to manufacturing tolerances, cylindrical surfaces cannot be manufactured to the result that a simple change of the plug, or unplugging and replugging, would be possible without readjustment. Every fitting surface has a certain degree of looseness, which causes the plug to be plugged into, and fixed in, the socket with a slight tilt, an angular deviation from the cylinder symmetry axis of the mount of the socket. Some compensation can be attained by a corresponding repositioning of the lens, which is a complicated and time-consuming procedure. Even highly precise plugs achieve accuracies of only 0.35 µm regarding the deviation from the symmetry axis of the fitting surface, which, with a guiding length of 5 mm, corresponds to an angular error of 70 µrad.

Like the cylindrical fitting surfaces or vee bearings used in prior art as contact faces and mating contact faces, plane surfaces produced by common methods as, e.g., grinding have certain tolerances in the planeness or roughness of the surface, which amount to several micrometers, as a rule, which results in a positioning accuracy of the same order of magnitude. The angular errors in this case amount to several 100 µrad up to several mrad.

Thanks to the smoothing of the contact faces and mating contact faces, the error in planeness can be reduced to less than 100 nm; the remaining deviations from a really plane face are so slight as to allow problem-free disconnection and joining of plug and socket, with reproducible setting of the high initial accuracy without the need of renewed adjusting. The assembly of mount and lens remains fixed in the positions once adjusted, even as the plug is disconnected from the socket.

Smoothing of plane surfaces is particularly easy to perform, and the planeness can easily be checked by means of optical interference methods. In one embodiment, the at least one contact face of the plug and the at least one mating contact face of the socket are mechanically smoothed, polished, lapped, or diamond-turned. Simple rotary polishing without diamond is also possible. With all such methods, the necessary surface finish can be easily attained. The methods can be performed manually as well as by machines. Other mechanical smoothing methods that lead to the same result may also be employed.

Finally, smoothing methods other than mechanical may be used if they lead to desired result. Generally, the method can also be used with cylindrical fitting surfaces, in which case the decisive criterion is not the errors in planeness but the deviations of the radius of the cylinder in every position on the cylinder surfaces of the contact face and the mating contact face. However, cylindrical surfaces are more difficult to produce to such accuracy; also, checking them for accuracy is much more difficult than in case of plane surfaces.

Frequently, the specified requirement for the angular position, i.e. the angular alignment of the exiting or entering light beam, is that the optical axis of the lens essentially coincides with the center of the light exit surface of the optical waveguide, which corresponds to an angle of zero degrees. Other angular positions can also be set, though, depending on the desired application. In one version of the method, the at least one contact face and/or the at least one mating contact face is/are hardened, or lined with hardened material, prior to smoothing. This way is of advantage, e.g., if one of the two faces is configured as a continuous plane surface, whereas the other component is provided with several smaller faces for contacting. For example, the plug may be provided with feet whose bottom surfaces form the contact faces. In this case, only the bottom surfaces need to be hardened or lined with some hardened material such as ceramics, sapphire or glass, or they may be completely made of these materials. The—commonly metallic—mating contact face may also be hardened. Hardening the surfaces may be done, e.g., by anodizing. Suitable materials for such hard coating are, e.g., titanium or aluminum. Alternatively it is possible to form the entire contact face or mating contact face as an insert consisting of a hard material such as ceramics, sapphire or glass. Inserts of previously hardened material are also feasible.

It is expedient to align the contact face and the mating contact face perpendicularly to the propagation direction of the light beam. The direction vector of the light beam then has no component in the plane of the contact face or mating contact face, which facilitates alignment.

In one embodiment, the quality of the smoothing of the face is checked by means of interference measurements as known in prior art. Based on the result of the interference measurements, a plane surface that is within the desired tolerance, i.e. having an error in planeness of less than 100 nm, can be produced iteratively by a few steps. The alignment relative to the propagation direction of the light beam can be checked in such a way that the plug with its at least one contact face that is being machined is inserted into a reference socket having a plane mating contact face. Then the position of the exiting light beam can be determined, and an appropriate correction be made, so that correct alignment can be accomplished iteratively by a few steps. The light beam can, for example, be detected by a high-resolution CCD camera at the focus of an auxiliary lens with a great focal length of, e.g., f=50 cm in order to determine the deviation as accurately as possible. In this process, the plug can be rotated on the mating contact face about an axis perpendicular to this face; the light spot formed on the CCD array by the beam then describes a circular path about the optical axis. The center of the circle exactly marks the perpendicular position to be attained by correction. Compared to individual measurements, this rotational measurement method offers a markedly higher and, in fact, absolute accuracy. Depending on the lens and CCD camera used, resolutions of fractions of a second of arc can be achieved.

To permit the plug connection to be disconnected and joined again without readjustment so that the same beam position is adopted again, one would pre-adjust once, at the beginning during assembling the plug, the distance between the light exit surface of the optical waveguide or fiber in the first plug component and the lens in the second plug component, this lens consisting, as a rule, of a single lens element, a cemented lens component, or a number of single lens elements mounted or fixed at specified distances from each other; then one would fix the optical waveguide in the respective position. In one embodiment, the distance between the light exit surface and the lens is adjusted by means of divergence minimization. The method of divergence minimization has been mentioned as an example, but other methods known in prior art for adjusting the distance can also be employed, of course. The light exit surface, i.e. the end of the optical waveguide, which may be of a flat or angled flat configuration, is first positioned in the vicinity of the lens focus and then shifted along the z direction until the divergence is minimal. In this way, a collimated beam is produced; convergent or divergent beams can also be brought about, if required, by inserting or interposing suitably designed measurement optics between the plug and the divergence measuring system. A subsequent adjustment of the angular position of the light bundle exiting the plug is achieved by shifting the second plug component with the lens laterally, i.e. in the plane perpendicular to the optical axis of the lens. This position can be set with a high precision of about 100 nm. The adjustment of the angular position may also be carried out during, before or after the rotational measurement described above. The adjustment is best when the angle between the beam and the z axis is smallest. For fixing, the optical waveguide and/or the mount and/or the first plug component can be adhesively bonded, soldered or welded to each other. Fixing the parts to each other by screws is another possibility.

Generally, the contact faces may be provided on the first or second plug component; for easy adjustment, though, it is of advantage to provide a third plug component that bears the contact faces. If the contact location at which the plug is inserted into the socket essentially displays rotational symmetry with a rotation axis parallel to the beam, the unit consisting of the first and second plug components can be shifted relative to the third plug component in a plane perpendicular to the light beam. In this way, the parallel position of the beam can be adjusted centered, i.e. adjusted to a high accuracy so that the rotation axis and the optical axis coincide. Other, off-center positions can be set by adjustment, if required. The unit consisting of the first and second plug components is then finally fixed in the position set by adjustment. The precision achievable by these and the other previously described adjusting measures is approximately 3 µm. With reference to a typical beam diameter of 700 µm, this is less than 0.5% of the beam diameter. Compared to this, the accuracy of the most precise flat connectors known in prior art is 0.35 µm for a beam diameter of 5 µm, that is 7% of the beam diameter.

In view of the fact that, as the light beam passes an ideal optical system, the product of angular deviation and parallel deviation remains constant, a plug according to the invention offers the advantage that the—inevitable—manufacturing tolerances are placed in such a way that they have the least effect on the overall performance in use. This is achieved in such a way that the smoothing of plane surfaces leaves only extremely small angular errors, whereas parallel positioning is carried out with the expanded beam, so that here again the relative error is very small.

In one example, the position measurement again is made by the rotation method, e.g., with the CCD camera, without any optics, now being placed as close as possible behind the plug. Finally, by repolishing the contact face(s) on the third plug component, the angular deviation can be further reduced to fractions of a second of arc.

In one embodiment, locking the second plug component in place relative to the first plug component is accomplished by means of spring force. It is expedient to adjust the spring force so that the locking withstands shocks and changes in acceleration, as may happen, e.g., during plug changing or transport. On the other hand, though, it must be possible to adjust the lens by shifting the second plug component in the plane perpendicular to the optical axis of the lens, e.g., by means of adjusting screws. In this way, the adjusting screws used, for example, can be removed later. Another possibility is to use several adjusting screws or similar means and then leave them in the in the plug, although this method involves a greater material expenditure. Alternatively, the spring force may be further increased after adjustment.

Once both the light beam is aligned as described above and the contact face of the plug and the mating contact face of the socket are polished and aligned, the plug, on being connected to the socket, must be aligned in the socket, which means that, in case of an essentially rotation-symmetrical connection it must be centered, so that the light beam can enter the instrument to which the socket is attached, through a suitable orifice. In that, the light beam must be positioned in such a way that it reaches the exactly defined exit point within the orifice without disturbing its angular position. The accuracy depends on the requirements of the downstream optical instrument; typical values are about 5 µm for a beam diameter of 700 µm. Expediently, therefore, radial adjustment of the plug in the socket is effected by means of a centering collar and its locking in place.

The plug, then, is inserted into the socket so that alignment is possible in a plane parallel to the plane in which the contact face and the mating contact face are located. Adjustment is effected by shifting the centering collar in this plane, which results in a corresponding shift of the plug relative to the socket. Once optimum functioning is achieved, the centering collar is locked in place on the socket. The gap between plug and centering collar must be smaller than the admissible tolerance of positioning, e.g., smaller than 5 µm. In one embodiment, therefore, the centering collar has two radial contact points arranged at an angle of, e.g., 90° relative to each other, against which the plug is pressed, so that errors due to the gap are excluded. In the end, the plug is locked in place by another device such as, e.g., a spring ring in the socket or in the centering collar.

The steps of the method need not necessarily be carried out in the succession described. It is also possible to perform the alignment of the contact faces and mating contact faces in two steps, e.g., by carrying out a first plane polishing operation, then inserting the plug into the socket and making an adjustment of the lens by the rotation method described above, and finally carrying out another fine polishing operation for the final alignment of the beam perpendicular to these faces to an accuracy of about 2 µrad.

It is to be understood that within the scope of the present invention, the features mentioned before and explained below are applicable not only in the combinations stated but also in other combinations or as stand-alone features.

BRIEF DESCRIPTION OF THE DRAWINGS

Below, the invention will be explained in more detail with reference to the accompanying drawings, which also show features essential to the invention.

DETAILED DESCRIPTION OF THE DRAWINGS

Figure 1:
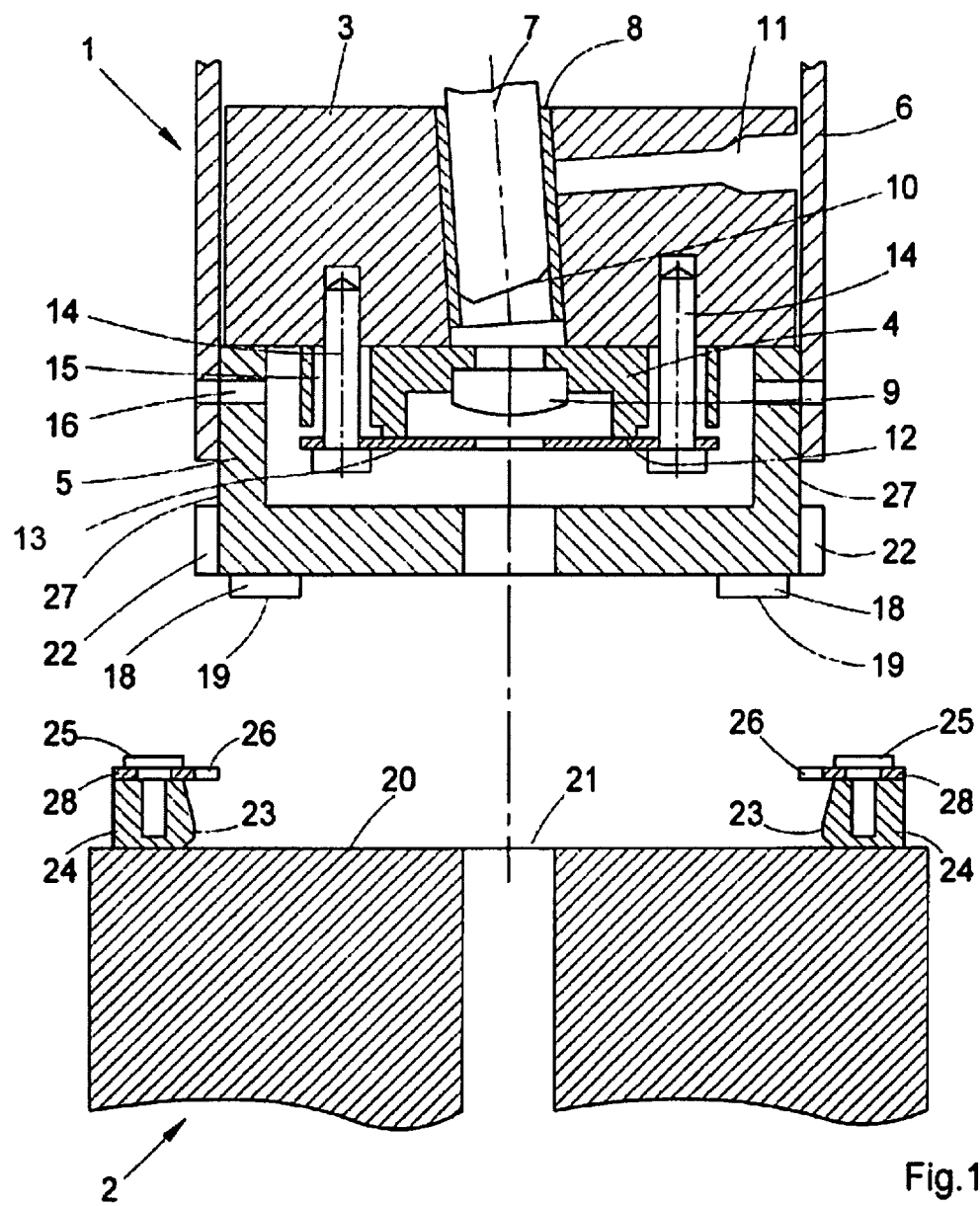
FIG. 1 shows a longitudinal section of an optical plug connection, consisting of plug and socket.

FIG. 1 shows a plug 1 according to the invention above a socket 2 according to the invention. The plug 1 consists of a first plug component 3, a second plug component 4, and a third plug component 5. The first plug component 3 and the third plug component 5 are encased by a housing 6. The first plug component 3 has a hole, which is tilted relative to the symmetry axis and serves as a fixture for the optical fiber 7 mounted in a ferrule. The optical fiber 7 is surrounded and held by a sleeve 8. For adjusting the optical fiber 7 along its symmetry axis, the sleeve 8 is shifted in the fixture. The adjustment should be made in such a way that the focus of a lens 9, here configured as a collimating lens, is as close to the center of the exit surface 10 of the optical fiber 7 and a collimated beam is produced. The optical fiber 7 shown in FIG. 1 is an optical waveguide of the AFC (angled flat connector) type, in which the light exit surface 10 is arranged at an angle with the symmetry axis of the optical fiber 7 or the beam direction in order to prevent back reflections into the laser or the optical system. Because of the light refraction at the light exit surface 10, therefore, the position of the optical fiber 7 is slightly tilted relative to the optical axis of the lens 9 and the connection between plug 1 and socket 2. One can also use fibers of the (flat connector) type, in which case the fiber is not given a tilted position. Further, the first plug component 3 is provided with an orifice 11. The orifice 11 can accommodate a screw (not shown here) with which the position of the sleeve 8 relative to the first plug component 3 can be fixed and locked. The housing 6 may be configured so as to cover the orifice 11 in the assembled state.

The lens 9 is held in the second plug component 4. One end of the second plug component 4 bears against the first plug component 3. At its opposite end, the second plug component 4 has a circular locating face 12, on which rests a likewise round diaphragm 13. The diaphragm 13 has an orifice at its center, from which the light beam collimated by the lens 9 exits.

The second plug component 4 is connected with the first plug component 3 by means of screws 14. For this purpose, the second plug component 4 has holes 15 through which the screws 14 are put. The diameter of the holes 15 is greater than the thread diameter of the screws, so that there is some looseness between second plug component 4 and the screws 14. However, the screws 14 also connect the diaphragm 13 to the second plug component 4. As the diaphragm 13 only rests on the locating face 12 of the second plug component 4, the screws 14, in the end, establish a frictional connection between the first plug component 3 and the second plug component 4.

The screws 14 can be tightened to a degree that permits a wanted shifting of the second plug component 4 relative to the first plug component 3 along the contact face, i.e. the x-y plane, by means of adjusting screws, while preventing an accidental shifting caused by slight shocks. In this case, the third plug component 5 can already be attached and connected with the first plug component. The adjusting screws can then, e.g., be inserted through the orifices 16. Later, these orifices 16 can be used for connecting the housing 6 to the third plug component 5.

Adjusting the lens 9 relative to the light exit surface 10, i.e. along the z axis, in one embodiment, performed by means of divergence minimization, e.g., in a simulation plug. It is also possible, of course, to vary the position of the light exit surface 10 by shifting the sleeve 8 with the optical fiber 7. Adjusting the collimating lens in the x-y plane is, in one embodiment, done within a rotational measurement, in which first the position of the z axis is determined and then the deviation from the z axis is minimized. This axis need not yet coincide with the desired optical axis at this stage.

Figure 2:
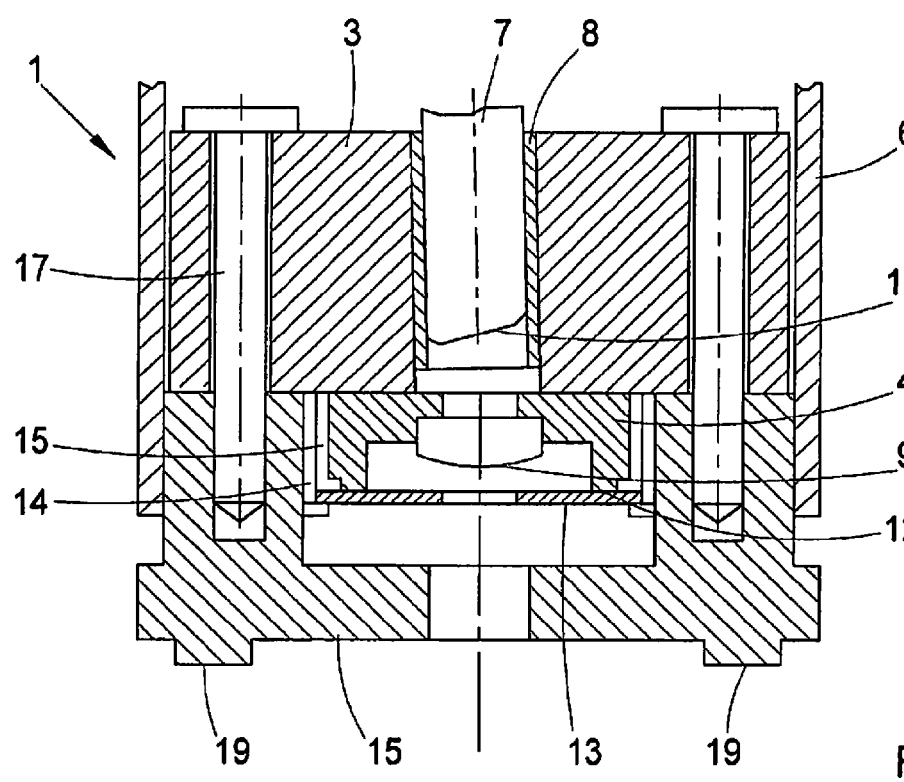
FIG. 2 shows a longitudinal section of the plug, which is rotated through 45° relative to the longitudinal section of FIG. 1.

The third plug component 5 is then connected with the first plug component 3 so as to encase the second plug component 4. The connection of the first plug component 3 and the third plug component 5 can be effected, e.g., by means of screws 17 as shown in FIG. 2. The section of the plug shown in FIG. 2 is rotated through 45° compared to the section shown in FIG. 1; the second plug component 4 has the shape of a clover leaf, and the third plug component 5 that of a hollow clover leaf. In this way it is possible to independently connect the second and third plug components 4 and 5 to the first plug component 3. This is a benefit 6 for adjustment and for alignment with regard to the direction and position of the collimated light beam.

A the end of the third plug component 5 that faces the socket 2, contact feet 18 with contact faces 19 are provided. Altogether, at least three such contact feet 18 must be provided to permit reliable location and precise smoothing. As shown here as an example, the contact faces 19 may consist of the same material as the contact feet 18 and the third plug component 5, with the contact faces 19 optionally being hardened. Alternatively, inserts of some hard material such as ceramics or fused quartz may be provided. The plane in which the contact faces 19 lie forms a right angle with the optical axis of the lens 9, which represents the direction of light propagation. This permits particularly simple alignment of the faces relative to the optical axis, as in the aligned state, the light propagation direction has no component lying in the plane. After the assembly of the plug 1—with or without housing 6—the contact faces 19 are aligned by means of mechanical smoothing, e.g., by polishing or lapping.

After the alignment of the contact faces 19, the plug 1 is inserted into the socket 2 as indicated in FIG. 1. In the present example, the socket 2 has a mating contact face 20. The mating contact face 20 is polished or lapped, just as are the contact faces 19. The mating contact face 20 is likewise aligned perpendicularly to the propagation direction of the collimated light beam, so that a light beam of highest positional accuracy is couple into the application optics behind socket 2.

However, the contact faces 19 of the plug 1 should, within the required accuracy, lie in a plane perpendicular to the direction of light propagation. This permits the plug to be exchanged with other plugs manufactured to the same precision. In case of such an exchange, no readjustment of the application optics relative to the beam direction is necessary.

The plug 1 is provided with lugs 22 at its circumference. The socket 2 is provided with a centering collar 24, which can be shifted on the socket 2 or the mating contact face 20 within a given looseness, and fixed. During assembly, the plug 1 is placed into the centering collar 24. The lugs 22 of plug 1 then bear against the inside of socket 2 in an essentially exact fit. It is of advantage if the inside is made with an exact fit only in a small, annular zone 23; this reduces frictional resistance and unwanted tilt of the plug 1 in the socket 2. Alignment of the beam in the plane of the mating contact face 20 is now possible by means of the centering collar 24, which is fixed on the socket 2 with screws (not shown). The centering collar can be shifted on the socket 2 so that the parallel position of the beam can be fixed in any desired point, e.g., relative to external locating points, by fixing the centering collar 24. In particular, the beam can be centered to an accuracy of about 5 µm.

For fixing the plug 1 in the socket 2 in the desired position, a spring ring 28 is provided. This is fastened to the centering collar 24 with screws 25. The spring ring is provided with lugs 26. Easy disconnection and reconnection of plug 1 and socket 2 is possible if the lugs 26 exactly fit to the lugs 22 and recesses 27 on plug 1, with the lugs 26 optionally being configured as springs, which in the recesses 27 exert a force on the lugs 22 of plug 1 and press it into the socket 2. If the lugs 26 and 22 are provided only in selected places of the circumferences of plug 1 and socket 2, respectively, a frictional connection between plug 1 and socket 2 can be established by insertion and subsequent rotation of the plug 1.

Figure 3:
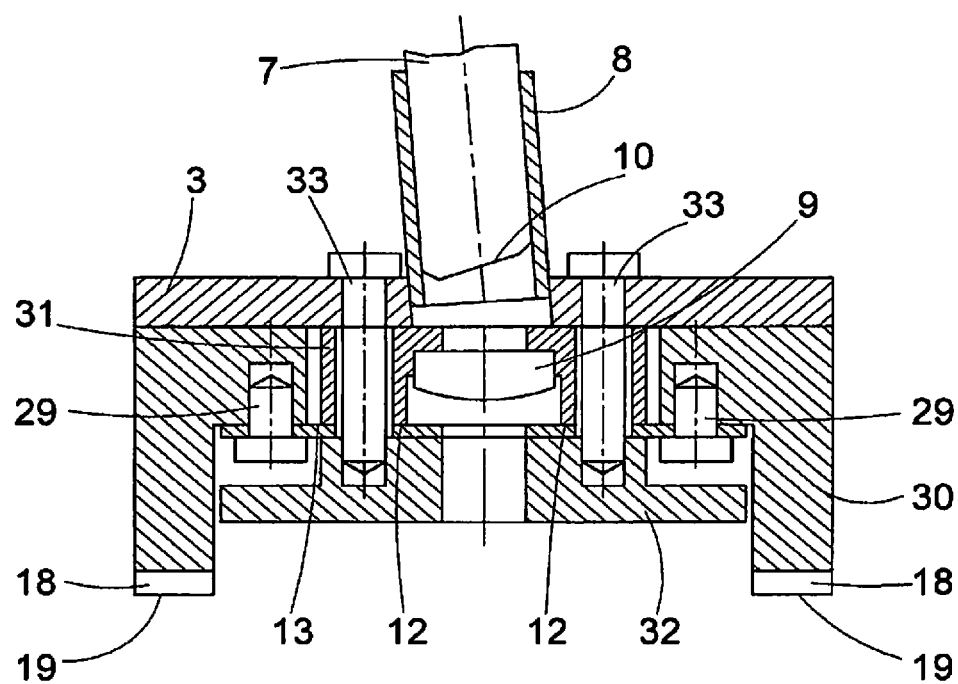
FIG. 3 shows a longitudinal section of an alternative embodiment of a plug.

FIG. 3 shows a longitudinal section of an alternative embodiment of a plug 1. Here, the diaphragm 13 is connected, by one or several screws 29, with the third plug component 30 rather than with the first plug component 3. The drawing does not show that the third plug component 30 is, similar as shown in FIG. 2, also connected with the first plug component 3, optionally by screws; alternatively, though, the connection can be configured in such a way that the screws 29 connect the diaphragm 13 with the third plug component 30 and the first plug component 3, so that a firm screw connection of all three components 3, 13, 30 is established. In this case, too, the second plug component 31 has sufficient looseness for alignment.

The plug 1 further comprises a pressure piece 32, which presses the diaphragm 13 and, via the diaphragm 13, the second plug component 31 against the first plug component 3. The pressure piece 32 may, for example, be screwed against the diaphragm 13 by means of a thread worked into the third plug component 30. As an alternative, as shown in FIG. 3, it is also feasible to provide screws 33 for screwing the pressure piece 32 to the first plug component 3; the holes for the screws 33 in the diaphragm 13 and in the second plug component 31 are greater than fitting the screws in order to permit adjustment of the second plug component with the optical element even with the diaphragm 13 slightly tensioned. This configuration makes it possible to prevent a change of position of the already adjusted second plug component 31 when the screws 33 are tightened and, thus, the diaphragm 13 is tensioned.

The embodiment with a pressure piece 32 just described is particularly well suitable for use in the case of plugs for coupling laser light into a fiber. These, as a rule, are changed less frequently, so that for adjustment it is sufficient if the contact faces 19—e.g., on contact feet (18) screwed to the third plug component 30—are simply smoothed, e.g., by grinding. The accuracy required in this case is less stringent than that for the outcoupling of light from the fiber into the beam path of an application instrument. Highly accurate parallel alignment of the first plug component 3 and the third plug component 30 is not required either then. Therefore it is possible in that case to configure the first plug component 3 and the third plug component 30 as a single piece. More or less, this constitutes a simple coupler.

The invention described above makes it possible for a user to connect, disconnect and reconnect plugs 1 of the invented type with sockets 2 of the invented type any number of times without the need of renewed adjustment if plug 1 and/or socket 2 are exchanged. In illuminating optics, for example, into which different laser light sources are to be coupled in succession, an optical plug connection of the invented type, in which the fiber coming from the light source ends, makes it possible to change the light source by simply changing the plug without the need of readjustment. The effort of manufacturing such plug connections is relatively modest, as it essentially involves the fabrication of plane surfaces only, although to a high accuracy.

LIST OF REFERENCES 1 plug
2 socket
3 first plug component
4 second plug component
5 third plug component
6 housing
7 optical fiber
8 sleeve
9 lens
10 light exit surface
11 orifice
12 locating face
13 diaphragm
14 screw
15 hole
16 orifice
17 screw
18 contact foot
19 contact face
20 mating contact face
21 orifice
22 lug
23 annular zone
24 centering collar
25 screw
26 lug
27 recess
28 spring ring
29 screws
30 third plug component
31 second plug component
32 pressure piece
33 screws

The invention claimed is:

1. An optical plug connection for optical waveguides, comprising a plug and a socket, wherein the plug comprises a lens, wherein the socket is disconnectable from the plug and comprises a centering collar which is locked in a predetermined position on the socket, wherein the socket further comprises a spring ring fastened on the centering collar that fixes the plug in the socket and wherein the plug has at least one plane, smoothed contact face aligned relative to a propagation direction of a light beam exiting or entering the plug, the contact face to rest on at least one corresponding plane, smoothed mating contact face of the socket aligned relative to the propagation direction of the light beam, with the light beam perpendicularly intersecting a plane in which the at least one contact face and the at least one mating contact face are located, wherein, when the plug is inserted in the socket, a frictional connection between the plug and the socket is achieved by rotational movement, thereby permitting the plug connection to be disconnected and joined again without readjustment.

2. An optical plug connection as claimed in claim 1, wherein the at least one contact face of the plug and the at least one mating contact face of the socket are mechanically smoothed.

3. An optical plug connection as claimed in claim 2, wherein at least one of the at least one contact face of the plug and the at least one mating contact face of the socket are lapped or polished.

4. An optical plug connection as claimed in claim 3, wherein the plug further comprises at least an outer layer of the at least one contact face of hardened material.

5. An optical plug connection as claimed in claim 3 wherein the plug further comprises several contact faces in the form of contact feet.

6. An optical plug connection as claimed in claim 2 wherein the means for aligning the lens across an optical axis of the lens comprises at least one resilient element, for frictional connection of the second plug component with the first plug component the resilient element comprising a diaphragm that is connected with the second plug component by one or several screws that connect the second plug component with the first plug component, and wherein the resilient element presses the second plug component against the first plug component with the second plug component having some looseness for alignment.

7. An optical plug connection as claimed in claim 6, wherein the at least one resilient element is, by one or several screws, connected with the third plug component and this is connected with the first plug component, by which the second plug component is pressed against the first plug component, with the second plug component having some looseness for alignment.

8. An optical plug connection as claimed in claim 7, wherein the first plug component and the third plug component form a single-piece unit.

9. An optical plug connection as claimed in claim 6, wherein the plug further comprises a pressure piece which presses the resilient element and, thereby, the second plug component against the first plug component.

10. An optical plug connection as claimed in claim 1, wherein the plug, further comprises
 a first plug component with a hole that serves as a fixture for holding one end enclosed in a mount of an optical waveguide,
 a second plug component with the lens,
 means for aligning and fixing the end of the optical waveguide in the fixture along a beam direction,
 means for aligning the lens across an optical axis of the lens comprising a resilient element in the form of a diaphragm, and
 a third plug component, comprising the at least one contact face and connected with the first and/or second plug component.

11. An optical plug connection as claimed in claim 10 wherein the hardened material comprises a hardened metal alloy.

12. An optical plug connection as claimed in claim 1 wherein the at least one contact face comprises, ceramic, sapphire, fused quartz or a combination of the foregoing.

13. An optical plug connection as claimed in claim 1, wherein the socket comprises a centering collar for aligning the plug in a plane perpendicular to the beam direction.

14. An optical plug connection as claimed in claim 13, wherein the socket comprises at least an outer layer of the at least one mating contact face that comprises hardened material.

15. An optical plug connection as claimed in claim 14, wherein the hardened material comprises a metal alloy.

16. An optical plug connection as claimed in claim 13, wherein at least an outer layer of the at least one mating contact face comprises, a hard material that has an absolute hardness of greater than 100.

17. An optical plug connection as claimed in claim 16, wherein the hard material comprises ceramics, sapphire or fused quartz.

* * * * *